United States Patent [19]

Singh et al.

[11] Patent Number: 5,012,079
[45] Date of Patent: Apr. 30, 1991

[54] BAR CODE SCANNER MIRROR ASSEMBLY

[75] Inventors: Ishwar Singh, Winter Springs; William Senkevich, Longwood, both of Fla.

[73] Assignee: LazerData Corporation, Orlando, Fla.

[21] Appl. No.: 435,158

[22] Filed: Nov. 13, 1989

[51] Int. Cl.$^5$ .............................................. G06K 7/10
[52] U.S. Cl. .................................... 235/467; 235/472
[58] Field of Search ...................... 235/462, 467, 472; 350/6.5; 250/566, 568

[56] References Cited

U.S. PATENT DOCUMENTS

| | | | |
|---|---|---|---|
| 4,493,989 | 1/1985 | Hampson | 235/464 |
| 4,871,904 | 10/1989 | Metlitsky | 235/467 |
| 4,938,551 | 7/1990 | Matsumoto | 350/6.5 |
| 4,971,410 | 11/1990 | Wike | 350/6.5 |

*Primary Examiner*—Harold Pitts
*Attorney, Agent, or Firm*—William M. Hobby, III

[57] ABSTRACT

A rotatable bar code scanner mirror assembly includes a rotatable mirror support frame operatively coupled to an electric motor shaft for rotation with the motor shaft. A plurality of mirrors are attached to the rotatable mirror support frame with each mirror mounted to a frame in a different plane intersecting at least one other plane of a mirror mounted to the support frame. Each mirror is shaped to have a pair of generally flat offset portions, offset from each other, on opposite sides of a center axis and each offset portion is connected with a center mirror portion so that a return laser beam can be reflected off the offset portions and the outgoing laser beam reflected off the center portion so that the outgoing and return beams use the same scanner mirror assembly. Each of the offset portions is a generally rectangular shaped, flat mirror giving the mirror a zig-zag shape portion and each mirror is attached to a pair of generally parallel faceted frame portions to form a continuous faceted mirror assembly. The offset portions are formed to allow the return signal to be equalized. The outer lobes of the "z" are positioned to allow a maximum return which is balanced in amplitude.

8 Claims, 1 Drawing Sheet

BAR CODE SCANNER MIRROR ASSEMBLY

BACKGROUND OF THE INVENTION

The present invention generally pertains to optical scanning systems and is particularly directed to a mirror scanning assembly for use in scanning a code symbol consisting of a combination of spaced parallel bars affixed to an object.

A typical scanning system of this type includes a housing with a panel for defining a scanning region adjacent the panel for receiving objects having a bar code symbol, and a light source, such as a laser, for providing a light beam; and an optical system for scanning the light beam in a predetermined pattern throughout the defined scanning region. The system also includes a detection system for detecting light having at least a predetermined intensity reflected from the bar code symbols and for providing an electrical signal in response to detection of such reflected light; and an optical system for directing light from the scanned light beam that is reflected from the code symbol on a received object to the detection system.

These systems are useful in reading bar code symbols such as the Universal Product Code (UPC) code symbols that are affixed to many packaged grocery items. UPC code symbols consist of parallel bars having various widths and spacings. The electrical signals provided by the detection system in response to scanning the code symbol are provided to a data processing system which provides various functions in relation to the information represented by the electrical signal, such as registering and displaying the price of the item bearing the code symbol and adjusting inventory records concerning such items.

One consideration in using scanning systems of this type is the orientation of the code symbol within the scanning region defined by the panel so as to enable the full code symbol to be scanned by the light beam. In many prior art scanning systems, the code symbol must be precisely oriented within the defined scanning region in relation to the panel. The time consumed in precisely aligning the code symbol delays the scanning of a large number of items. One prior system that does not require precise orientation has a panel which defines the scanning region for receiving objects bearing a code symbol which includes light transmissive areas defining a "bar X" or double X scanning pattern. The present invention deals with a bar scanning mirror assembly for scanning double X bar patterns.

Typical prior art U.S. patents which show rotatable mirror assemblies can be seen in the Starkweather Pat. No. 3,944,323 for a variable spot size scanning system having a rotatable faceted mirror assembly with arcuate mirrors mounted thereto and in the Jeffery et al. Pat. No. 4,043,632 for a scanning polygon mirror assembly having adjustable mirrors mounted thereto. In the U.S. patent to Runciman No. 3,845,298 an optical scanning device has a rotating drum carrying a plurality of orthogonal planar mirrors. In the Bohn et al. Pat. No. 3,040,627 a rotating mirror assembly has one embodiment with cylindrical curvatures on the face of the mirrors. In the U.S. Pat. to Person No. 3,843,226, an apparatus for periodical parallel displacement of at least one parallel beam is provided while the Hayosh et al. Pat. No. 3,988,573 is a three line scanner for bar code symbols showing a typical bar code scanner having a rotatable mirror assembly therein. In U.S. Pat. No. 4,093,865 to Nickl, a typical double X bar pattern bar scanner is shown having a conventional rotating mirror scanner assembly with faceted mirrors rotated on an electric motor. The present invention is designed for use in a double X bar pattern scanner and specifically to the rotating mirror assembly for the scanner in which the rotating mirror assembly has shaped mirrors for directing the scanning and the return beam of a laser in a double x laser scanner.

SUMMARY OF THE INVENTION

The present invention relates generally to optical scanning systems and in particular to a rotatable bar code scanner mirror assembly for an optical scanning system and includes a rotatable mirror support frame operatively coupled to a rotatable shaft of an electric motor. A plurality of mirrors are mounted to the support frame with each mirror mounted in a different intersecting plane to at least one other mirror to form a faceted mirror assembly around the entire support frame. Each mirror is shaped to have a pair of generally flat offset portions offset from each other on opposite sides of a center axis and the offset portions are connected with a center mirror portion so that an outgoing laser beam can be reflected off the center portion and a return beam can be reflected off the offset portions so that both outgoing and return laser beams use the same scanner mirror assembly. Each mirror is shaped in a generally zig-zag pattern with the two flat offset portions being of a rectangular shape connected by the center rectangular shaped center portion and each mirror is mounted to the support frame such that one offset portion fits an offset portion of another mirror on the adjacent facet of the support frame. Each mirror is individually adjustable to align the mirror assembly for the outgoing and return laser beams.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
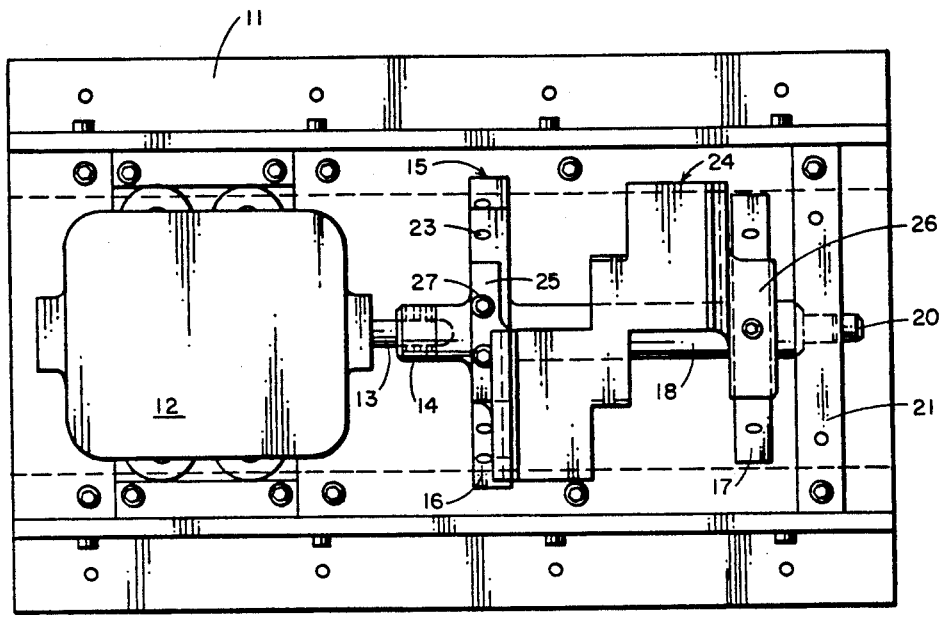
FIG. 1 is a top plan view of a rotatable bar code scanning mirror assembly in accordance with the present invention having one mirror attached to the frame.
Figure 2:
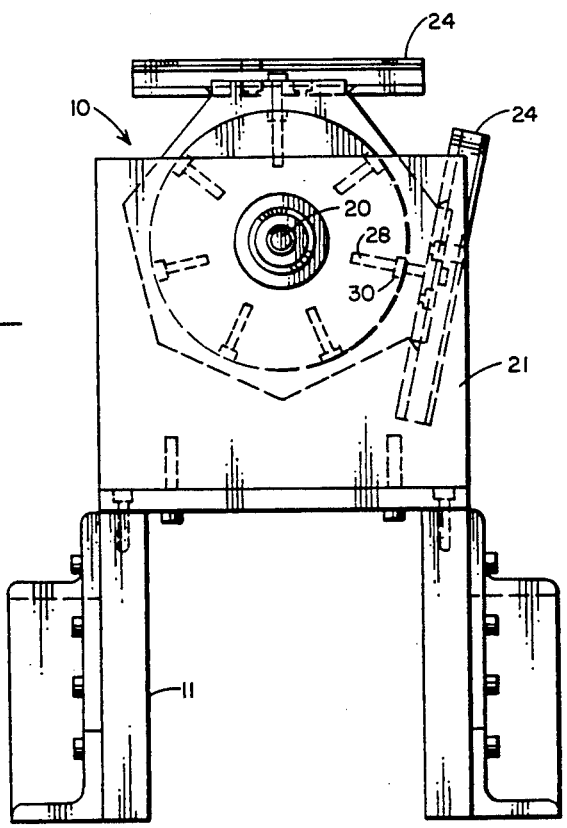
FIG. 2 is an end elevation of the mirror assembly of FIG. 1 having two mirrors attached to the frame.

Referring to the drawings and especially to FIGS. 1 and 2, a rotatable bar code scanner mirror assembly 10 includes a frame 11 having an electric motor 12 mounted thereto which motor has a motor shaft 13 attached to a shaft coupling 14 of a mirror support frame 15. The mirror support frame 15 has a faceted mirror support member 16 and a second faceted mirror support member 17 connected by a cylindrical center portion 18. A shaft portion 20 protrudes from one end of the cylindrical portion 18 and rides in a journal 21 attached to the frame 11. The journal 21 has standard ball bearings 22 mounted therein for the shaft 20 to rotate on responsive to the rotation of the motor shaft 13 thereby rotating the entire mirror support frame 15. Each of the support frame members 16 and 17 has a pair of threaded bores 23 therein for attaching a mirror 24 to each faceted portion of the mirror frame 15. Each mirror is thus attached on a plane which intersects with the plane of two other mirrors mounted to other faceted portions of the support frame 15. Thus, the mirrors are mounted across the frame support member 16 and 17 with a mirror support bracket 25 attached to the support frame member 16 and 26 attached to support bracket 17 with a plurality of threaded fasteners 27. Each faceted portion of the frame member 17 has a threaded adjustment member 28 passing therethrough as shown in FIG. 2 for bolting the mirror support bracket 36. The threaded member 28 has a lock nut 30 so that threading the threaded fastener 28 will slightly move the mirror on one side to slightly adjust the plane of the mirror and when properly adjusted, the lock nut 30 is tightened thereon.

Figure 3:
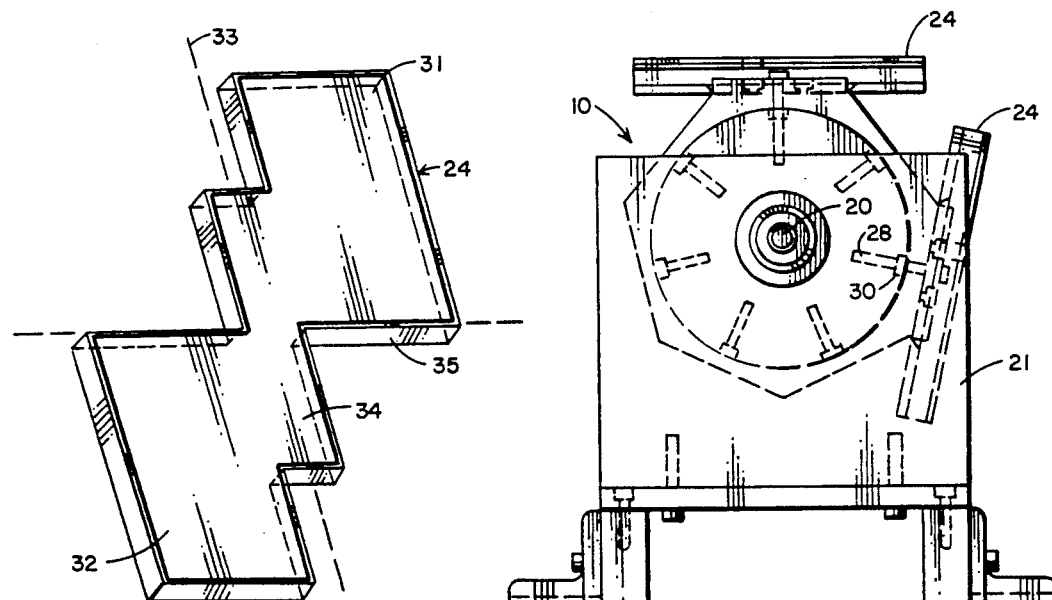
FIG. 3. is a perspective view of one mirror for the mirror assembly.
Figure 4:
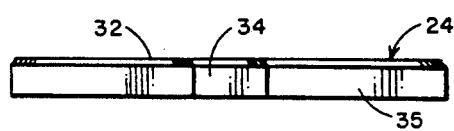
FIG. 4 is an end elevation of the mirror of FIG. 3.

Each mirror, as shown in FIGS. 3 and 4, has a generally zig-zag shape with a pair of rectangular offset portions 31, and 32 offset to either side of an axis 33 when connected with a center rectangular portion 34 aligned with the axis 33 and connecting the offset portions 31 and 32. The offset portions 31 and 32 are also offset from a transverse axis 35 and has one mirrored surface which is adhesively attached on either side to the brackets 25 and 26 which are attached to the frame members 16 and 17 to form a series of faceted surfaces around the rotatable frame 15. Each mirror is mounted so that each other mirror has an offset portion adjacent the offset portion of the mounted mirror on the opposite side of the axis 33 so that each mirror is aligned with the next mirror on the next planar surface of the rotating frame assembly 15. The mirror assembly advantageously allows a return beam from a bar code scanner, such as a double x scanning pattern, to be reflected off the offset portions 31 and 32 where they are positioned to maximize and equalize the return signal. The offset "z" shape allows the return signal to be equalized and are positioned to allow a maximum return which is balanced in amplitude. The outgoing beam can be reflected off the center portion 34 to allow the outgoing and return laser beams to use the same scanning mirror assembly while creating the desired scanning pattern and while allowing for the rapid adjustment to the mirrors in the mirror scanning assembly.

It should be clear at this point that a mirror assembly for a bar code scanner has been provided for use in a double x bar pattern or other predetermined configuration for scanning bar codes. However, the present invention is not to be construed as limited to the forms shown which are to be considered illustrative rather than restrictive.

I claim:

1. A rotatable bar code scanner mirror assembly comprising:
    a rotatable mirror support frame;
    a plurality of mirrors, each mirror mounted to said support frame in a different intersecting plane to at least one other mirror mounted to said support frame;
    each said mirror being shaped to have a pair of generally flat offset portions, each offset from the other on opposite sides of a center axis and said offset portions being connected with a center mirror portion whereby a return beam can reflected off the offset portions and the outgoing beam is reflected off the center portion such that the outgoing and return laser beams use the same scanner mirror assembly and the returning signals are substantially maximized and balanced in amplitude by the offset portions of the mirror.

2. A rotatable bar code scanner mirror assembly in accordance with claim 1 in which each said mirror offset portion is a generally rectangular portion.

3. A rotatable bar code scanner mirror assembly in accordance with claim 2 in which each said mirror center portion is a generally rectangular portion connecting said two offset rectangular portions to form one flat mirror having a generally zig-zag appearance.

4. A rotatable bar code scanner mirror assembly in accordance with claim 3 in which said rotatable mirror support frame is supported on a rotatable shaft.

5. A rotatable bar code scanner mirror assembly in accordance with claim 4 in which each said rotatable shaft is rotated by an electric motor.

6. A rotatable bar code scanner mirror assembly in accordance with claim 5 in which each said mirror is attached to a pair of generally parallel faceted frame portions and adjustably attached thereto for indiviually adjusting each mirror portion.

7. A rotatable bar code scanner mirror assembly in accordance with claim 6 in which each said mirror offset portion is is mounted to said frame adjacent a second mirror offset portion on the opposite faceted frame.

8. A rotatable bar code scanner mirror assembly in accordance with claim 7 in which said rotatable mirror support frame shaft is supported in a bearing mount and is attached to said electric motor and said electric motor is attached a frame.

* * * * *

UNITED STATES PATENT AND TRADEMARK OFFICE
CERTIFICATE OF CORRECTION

PATENT NO. : 5,012,079
DATED : April 30, 1991
INVENTOR(S) : Ishwar Singh et al.

It is certified that error appears in the above-identified patent and that said Letters Patent is hereby corrected as shown below:

Title page:

The inventors should be listed as:

> Ishwar Singh, Winter Springs,
> William Senkevich, Longwood, Florida
> William Daley, Longwood, all of Florida.

Signed and Sealed this

Twelfth Day of January, 1993

*Attest:*

DOUGLAS B. COMER

*Attesting Officer*     *Acting Commissioner of Patents and Trademarks*